R. C. SEYMOUR.
FOLDING MACHINE.
APPLICATION FILED NOV. 29, 1909.

1,025,486.

Patented May 7, 1912.
4 SHEETS—SHEET 1.

Witnesses:
John Darby
Rose Menke

R. C. Seymour, Inventor
By his Attorney John D. Morgan

R. C. SEYMOUR.
FOLDING MACHINE.
APPLICATION FILED NOV. 29, 1909.
1,025,486.
Patented May 7, 1912.
4 SHEETS—SHEET 2.
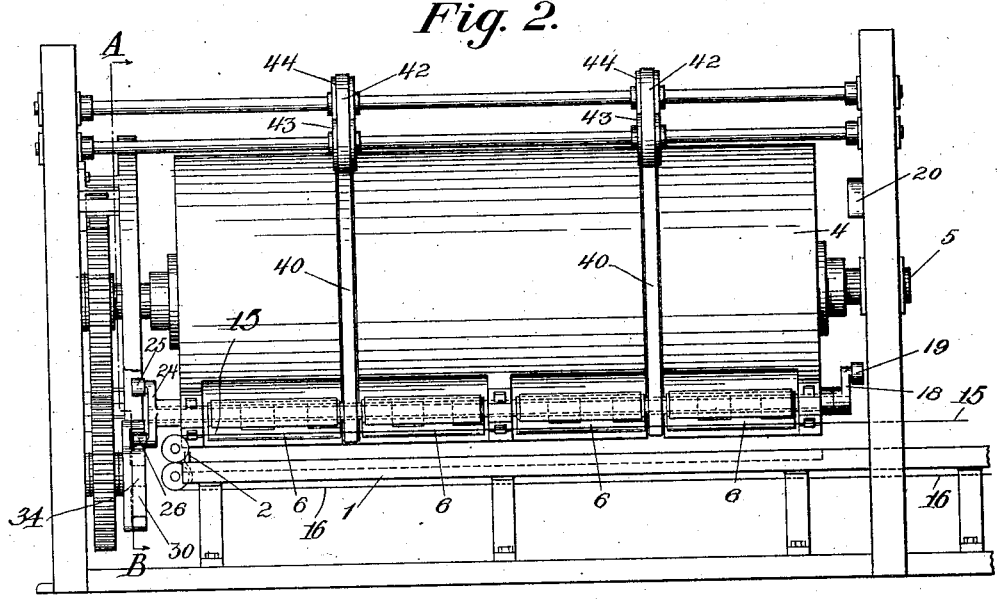
Fig. 2.
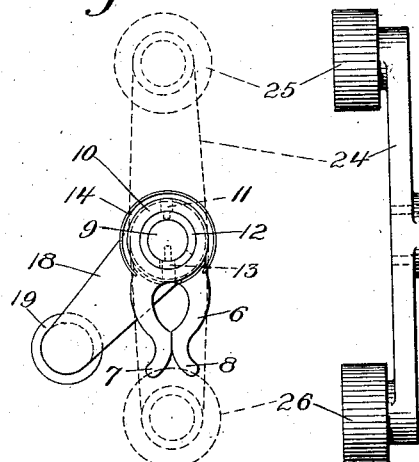
Fig. 8.
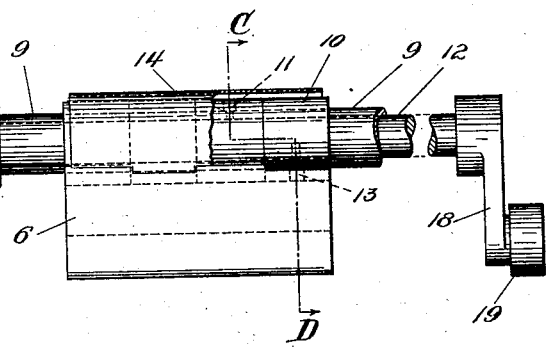
Fig. 9.
Fig. 10.
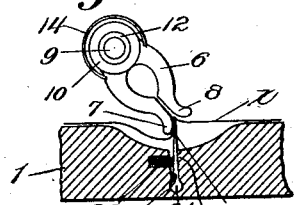
Fig. 14.
Witnesses:
John Darby
Rose Menk
R. C. Seymour
Inventor
By his Attorney John D Morgan

R. C. SEYMOUR.
FOLDING MACHINE.
APPLICATION FILED NOV. 29, 1909.

1,025,486.

Patented May 7, 1912.
4 SHEETS—SHEET 3.

Witnesses:
John Darby
Rose Menke

R. C. Seymour Inventor
By his Attorney John D. Morgan

R. C. SEYMOUR.
FOLDING MACHINE.
APPLICATION FILED NOV. 29, 1909.

1,025,486.

Patented May 7, 1912.

4 SHEETS—SHEET 4.

Fig. 11ᵃ

Witnesses:
John Darby
Rose Menk

R. C. Seymour Inventor
By his Attorney John D Morgan

COLUMBIA PLANOGRAPH CO., WASHINGTON, D. C.

UNITED STATES PATENT OFFICE.

RALPH C. SEYMOUR, OF LARCHMONT, NEW YORK, ASSIGNOR TO GOSS PRINTING PRESS COMPANY, OF CHICAGO, ILLINOIS, A CORPORATION OF ILLINOIS.

FOLDING-MACHINE.

1,025,486.

Specification of Letters Patent.

Patented May 7, 1912.

Application filed November 29, 1909. Serial No. 530,438.

*To all whom it may concern:*

Be it known that I, RALPH C. SEYMOUR, a citizen of the United States, and residing at Larchmont, in the county of Westchester and State of New York, have invented certain new and useful Improvements in Folding-Machines, of which the following is a specification.

The invention relates to folding machines and more particularly to folding machines in which the sheet is folded over a blade by a set or pair of jaws, the folded sheet then being carried away by the jaws.

In certain of its aspects the invention relates more particularly to certain forms, constructions and arrangements set forth in the accompanying drawings and description.

Other relations and objects of the invention will appear hereinafter.

The invention consists in the novel parts, constructions, combinations and improvements herein shown and described.

The accompanying drawings, referred to herein and forming a part hereof, illustrate one embodiment of the invention, the same serving in connection with the description herein to explain the principles of the invention.

Figure 1:
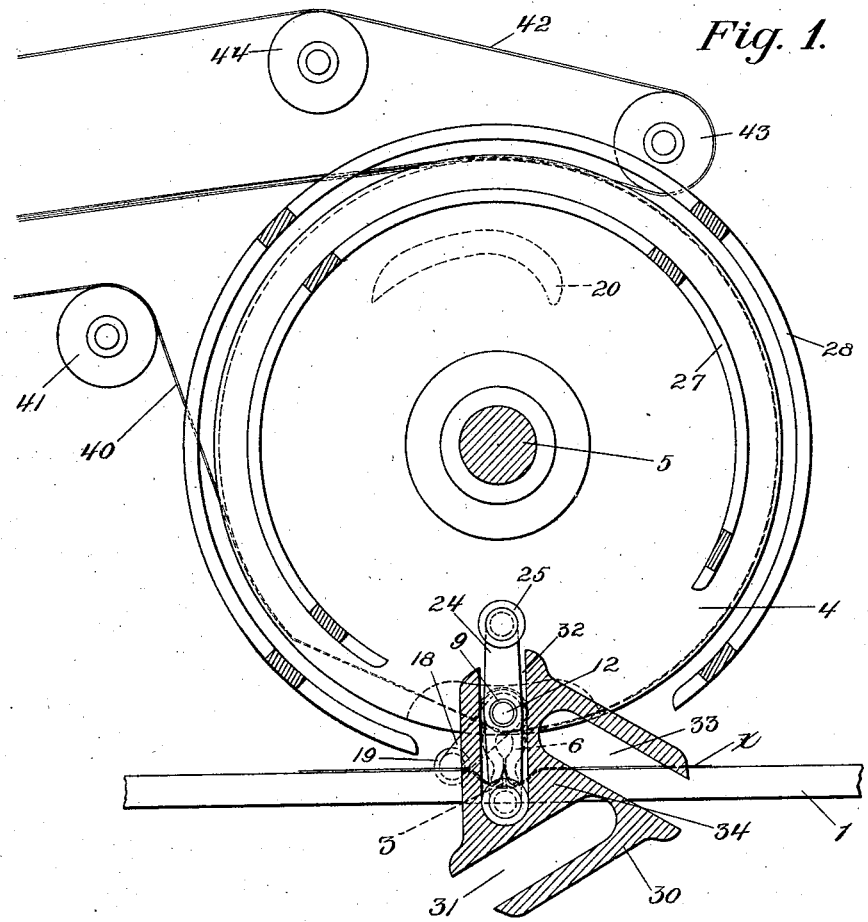
Figure 5:
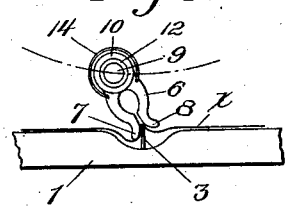
Figure 6:
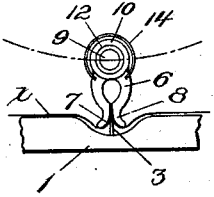
Figure 7:
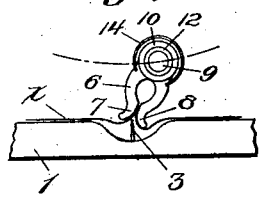
Figure 3:
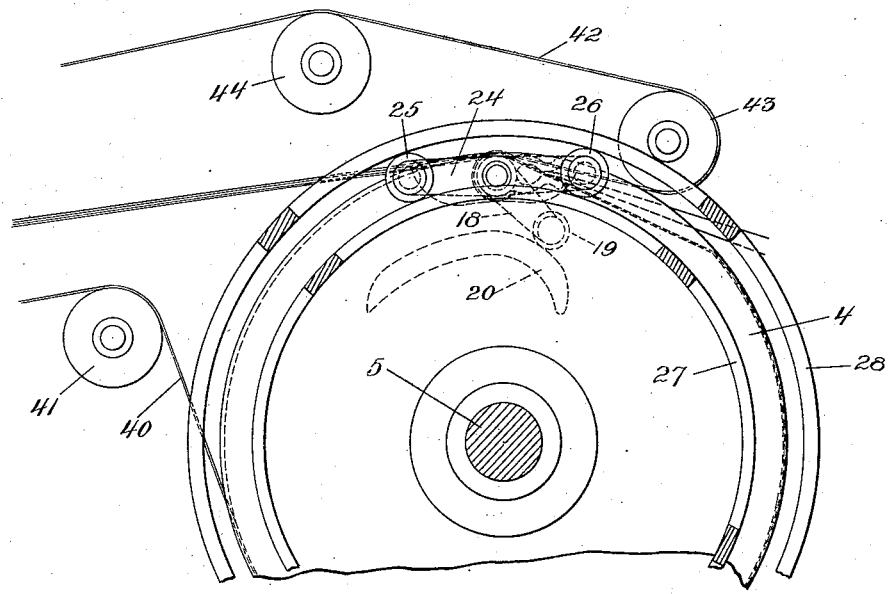
Figure 4:
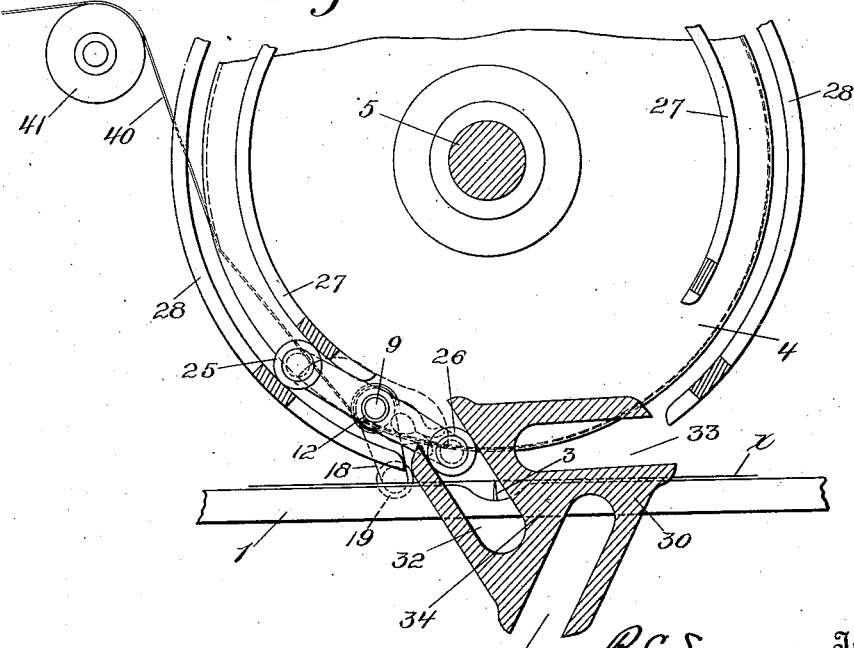
Figure 11:
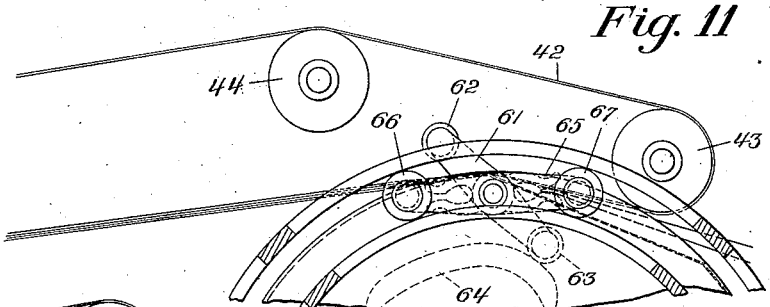
Figure 12:
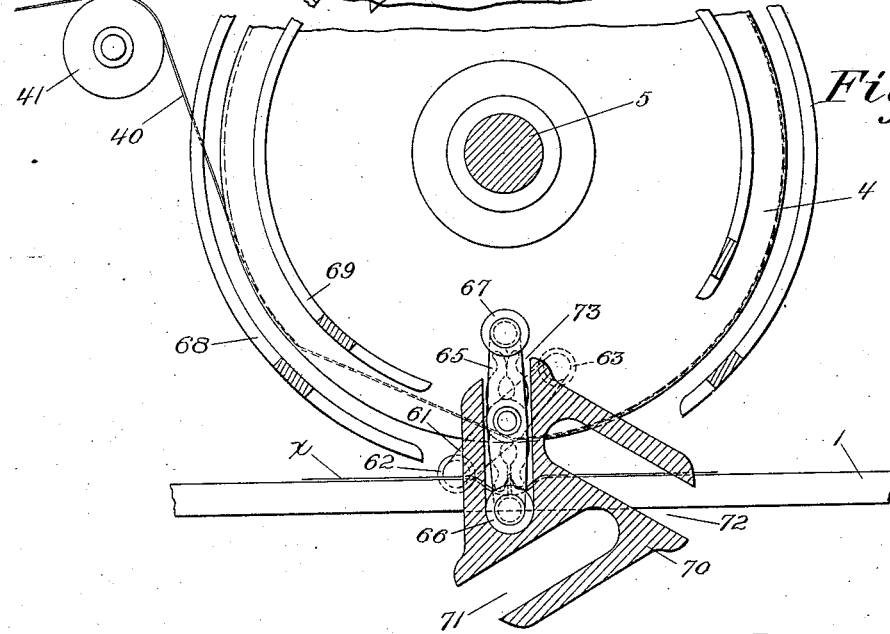
Figure 12:
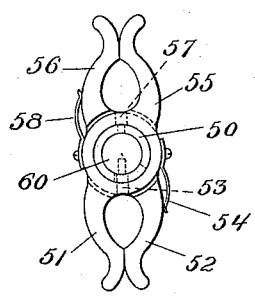
Figure 13:
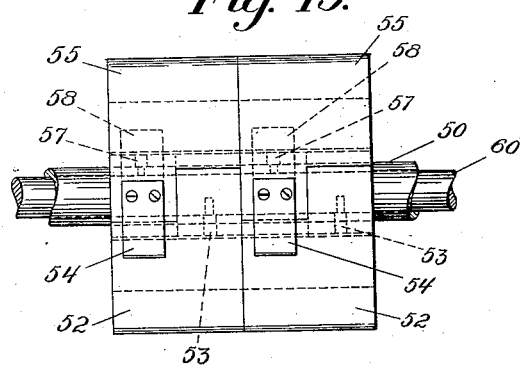

Of the drawings:—Figure 1 is a side elevation of a machine embodying the principles of the invention, certain parts being shown in section on the line A—B of Fig. 2; Fig. 2 is a side elevation looking at Fig. 1 from the right; Figs. 3 and 4 are fragmentary views corresponding to Fig. 1 but showing the parts in different positions; Fig. 3 showing the jaws at the delivery position and Fig. 4 showing them approaching the folding position. Figs. 5 to 7 are fragmentary and partially diagrammatic views showing various positions and operations of the folding jaws; Figs. 8, 9, and 10 are detail views relating to the construction of the folding jaws, Fig. 10 being a section taken on line C—D of Fig. 9; Fig. 11 shows the double folding jaws in the delivery position; Fig. 11a shows the jaws in the folding position; Figs. 12 and 13 show mechanism using the double folding jaw; and Fig. 14 shows a yielding folding blade.

Referring to the accompanying drawings, which illustrate by way of example one embodiment of the invention, suitable means are provided for bringing the sheet to be folded into operative relation and position with the folding devices. In the illustrated embodiment, and in accordance with certain features of the invention the sheet is brought to rest in registered position preparatory to folding. In the embodied form of such means a support 1 for the sheet is shown and also a registering stop 2. The sheet may be fed into position in any suitable or convenient manner, as for instance by the hand, by conveyer tapes, by grippers, or otherwise. A suitable folding blade is also provided, and is shown as a stationary blade 3 located below the sheet $x$ in the construction shown in the drawing.

The folding jaws travel to and fro between the folding blade and the place of delivery of the sheet and are shown mounted for movement relatively to their traveling carrier. In the present embodiment the carrier is rotatable about a center, and is shown as a cylinder 4 rotatable on the shaft 5. The set or pair of jaws 6 is shown movably, and further shown rotatably, mounted upon the cylinder 5, that is the two jaws 7 and 8 rotate together as a unit, as distinguished from the opening and closing movement wherein one of the jaws moves relatively to the other jaw. Said jaws are shown mounted on a hollow shaft 9 carried by said cylinder 4, the jaw 7 being provided with a tubular portion 10 fixed to the shaft 9 by any suitable means such as the screws 11. Within the shaft 9 is shown a shaft 12 rotatable with respect to said shaft 9, and the jaw 8 is fixed to the shaft 12 by suitable means such as the screw 13. In the present embodiment I have chosen to show the folding jaws held in a normally closed position by spring pressure, although this is immaterial so far as concerns many features of the invention. There is accordingly shown a spring 14 acting upon the jaw 8 to so hold it in the closed position with a yielding pressure.

In accordance with one feature of the invention, the sheet is fed in longitudinally of the axis of the folding jaws and of their carrier, and the folding jaws and blade make a longitudinal fold in the sheet, referred to its direction of travel. In the present embodiment, therefore, the sheet support or path 1 is shown coming in endwise of the cylinder 4, the frame of the machine being formed to support the cylinder shaft above the path 1 which is conveniently shown passing in through an opening in the frame (see Fig. 2). The registering stop 2 is shown arranged adjacent to the opposite end of the cylinder 4. There are also shown in Fig. 2 sets of tapes 15 and 16 for feeding in the sheets.

Suitable means are provided for opening the jaw 8 against its spring to deliver the sheet and for this purpose there is shown in the drawings an arm 18 fixed to the shaft 12 which arm may also be provided with a suitable roller 19. A cam 20 is provided conveniently located to rock the lever arm 18 in proper position to cause the folding jaws to deliver the sheet.

In the present embodiment no means are shown for opening or easing the folding jaws as they pass onto the folding blade to fold and take the sheets. In certain classes of work, however, it may be found desirable to employ a device for so opening or easing the folding jaws during the folding in operation. Such devices are old in the art and may be employed when desired. Means are likewise provided for controlling or governing the rotation of the folding jaws relatively to their cylinder or other carrier 4. The embodied form of such means comprises a member 24 shown as an arm or lever fixed centrally to the hollow shaft 9. This member 24 may be conveniently provided with rolls 25 and 26. Suitable guiding devices are provided both for preventing and causing the rotation of the set of jaws relatively to their cylinder as desired to perform their functions. The illustrated form of such means comprises members 27 and 28, conveniently carried by the machine frame and arranged concentrically with the cylinder 4. Between these members the rollers 25 and 26 may travel as in a guideway. Said guide members 27 and 28 are shown discontinued or interrupted adjacent to the folding blade. In operative relation with said guide members 27 and 28 are shown suitable means for receiving the controlling member 24 and causing it to give a proper rotatory movement with the folding jaws to cause them to approach the folding blade to fold the sheet thereover and take it therefrom. The embodied form of such means comprises a movable guide shown as a rotatable member 30 provided with slots 31, 32 and 33 and rotating about a shaft or center 34. Said slots are preferably arranged non-radially of the rotatable guide member 30, but may be arranged parallel to certain of its radii.

Suitable means for receiving the folded sheets are provided and the embodied form thereof comprises a set of tapes 40 passing about the cylinder 4 and also away therefrom being conveniently guided over rollers 41. Coöperating with said set of tapes 40 is shown a set of tapes 42 running over rollers 43 and 44, said two sets of tapes coöperating to carry away the folded sheets, when released by the folding jaws 6. These tapes are arranged to be in proper position relatively to the jaws at the moment of opening so that the tapes 40 will take the sheet on one side and the tapes 42 will take it upon the other side in a well known manner to convey it away.

According to certain features of the invention a double folding jaw, or two sets of folding jaws carried by a single supporting means and being rotatable or otherwise movable with respect to their carrier are provided. In the illustrated form thereof this jaw is shown in combination with a similar mechanism to that shown with the folding jaw 6, although it will be clear that same may be used in other combinations as well.

Referring to Figs. 11, 12 and 13 of the drawings, a hollow shaft 50 is shown having attached thereto the jaw 51 of one set of folding jaws and also having attached thereto the fixed jaw 55 of the second set of folding jaws. Within the hollow shaft 50 is shown a shaft 60 to which is fixed the jaw 52 of one set of grippers and the jaw 56 of the other set of grippers. The various jaws may be fixed to their shafts in any suitable manner, as by screws 53 and 57, as will be well understood. The hollow shaft 50 may be slotted to permit the movement of the screw connecting the moving jaw with the internal shaft 60. Suitable springs 54 and 58 may be provided to bear on the jaws 52 and 56 to hold them to the closed position. It will be observed also that the two sets of jaws are shown arranged diametrically opposite to each other relatively to their shaft.

Suitable controlling means for the folding jaws are provided and in the illustrated form thereof a double arm or lever 61 is shown attached to the shaft 60 (see Fig. 11) and carried by said arm are shown two rollers 62 and 63, which coact in the proper position with suitable means, such as the cam 64 to open the folding jaws to deliver the sheet. The form of controlling means for the sets of jaws to rotate them together relatively to their carrier is shown as a double arm or lever 65 fixed to the hollow shaft 50. Said lever 65 is shown carrying rollers 66 and 67, which coöperate with the guides 68 and 69 in substantially the manner previously described. The movable, or rotatable, guide member 70 with the guide slots 71, 72 and 73 may be constructed and act in the manner already described in connection with the corresponding part in the preceding figures.

In Fig. 14 of the drawings a flexible folding blade is shown, adapted to give with the moving jaws during folding in. The blade 3 is shown pivoted at 81 and bearing against the shoulder 82, being pressed thereagainst by the spring 83. The face 84 opposite the shoulder 82 is inclined to provide for the movement of the blade with the jaws in their travel and rotation.

The manner of operation of the herein described mechanism, and referring more particularly for the time being to Figs. 1 to 10 of the drawings, is substantially as follows: The sheet or sheets of paper are fed along on the table or support 1 and may be brought to register against the stop 2. As the cylinder 4 rotates, the rollers 25 and 26 run along in the guideway formed by the members 27 and 28. The set of jaws 6 is thus held from rotation relatively to the cylinder 4, and as they move toward the folding blade the jaws are pointed in the direction of their travel. As the set of jaws approaches the discontinuous or interrupted portion of the guideway, one of the guide slots in the guide member 30 passes into register or alinement with the guideway formed by the members 27 and 28. The foremost one of the rollers 25 and 26 runs into the guideway in the member 30 (as shown in Fig. 4) and by the movement of the cylinder 4 and the member 30 the set of jaws 6 is rotated as shown in Figs. 4 and 1 and also 5, 6 and 7 of the drawings. Thus the jaws are brought down on the folding blade (see Fig. 6) to fold the sheet over the blade, and then to carry away the folded sheet as shown in Fig. 7. The set of jaws turn off the folding blade as shown in Fig. 7, under the coaction of the guide 30 and the cylinder 4, continuing to rotate relatively to said cylinder 4. The guide member 30 then directs the leading roller on the arm 24 into the path between the guide members 27 and 28, the set of jaws being then moved into a position where they point in a direction opposite to the direction of their travel with the cylinder 4, thus serving to lay the folded sheet along the cylinder and above the tapes 40 on the surface thereof. The set of jaws 6 in the present mechanism, therefore, come toward the folding blade pointed in the direction of their travel, and are given a quarter turn onto the folding blade to fold the sheet. The jaws then move off the blade, taking with them the folded sheet and the jaws are then given a quarter turn to point in the direction opposed to that of their travel. As the set of jaws 6 carrying the folded sheet reaches position relatively to the tapes 42, the cam 20 engages the arm 18 and opens the jaw 8 away from the jaw 7 and the sheet passes off between the tapes 40 and 42. With a single set of jaws mounted on the cylinder and using but one of the guides 30, a sheet may be taken away every second revolution of the cylinder 4. If two sets of folding jaws are mounted on the cylinder, and preferably a semi-circumference apart, or if two guide members 30 are used, a sheet may be folded at every rotation of the cylinder 4. With the two sets of jaws on a single shaft, as shown in Figs. 11 to 13, the operations of the parts are substantially similar and will be clearly understood from the foregoing description. It may be stated further that on each rotation either the roller 62 or 63 on arm 61 will be in position to trip on the cam 64 to open the jaws to deliver the sheet to the tapes.

While the term "sheet" has been used in the description and also in the claims, it will be understood that the machine will fold bundles of sheets, either stitched or unstitched.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent is:

1. A folding machine including in combination sheet positioning means, a fixed folding blade in operative relation with the positioned sheet, a rotating carrier, a set of folding jaws rotatably mounted on said carrier, means for rotating said set of jaws relatively to said rotating carrier during the folding and taking of the sheet, and means for holding said jaws from rotation relatively to their carrier during the delivery of the sheet from said jaws.

2. A folding machine including in combination sheet positioning means, a fixed folding blade in operative relation with the positioned sheet, a rotating carrier, a set of folding jaws rotatably mounted on said carrier, means for rotating said set of jaws relatively to said rotating carrier during the folding and taking of the sheet, and means for delivering the sheet with said folded edge foremost while said jaws are at rest relatively to their carrier.

3. A folding machine including in combination sheet positioning means, a fixed folding blade in operative relation with the positioned sheet, a rotating carrier, a set of folding jaws rotatably mounted on said carrier, the jaws of said set being also movable relatively to each other about an axis substantially concentric with that of the set of jaws.

4. A folding machine including in combination sheet positioning means, a fixed folding blade in operative relation with the positioned sheet, a rotating carrier, a set of folding jaws movably mounted on said carrier, means for opening and closing the jaws, and means for causing intermittent rotation of the set of jaws.

5. A folding machine including in combination means for supporting a sheet at rest, a fixed folding blade in operative relation with the sheet, a swinging carrier, a set of folding jaws mounted to swing on said carrier, means for maintaining said set of jaws at rest relatively to said carrier as they move toward the folding blade, and means for swinging the set of jaws on its carrier as they fold and take the sheet from the folding blade.

6. A folding machine including in combination means for supporting a sheet at rest, a fixed folding blade in operative relation with the sheet, a swinging carrier, a set of folding jaws mounted to swing on said carrier, means for swinging the set of jaws on its carrier as they fold and take the sheet from the folding blade, and means for holding the jaws at rest relatively to their carrier as they recede from the blade carrying the folded sheet.

7. A folding machine including in combination means for supporting a sheet at rest, a fixed folding blade in operative relation with the sheet, a swinging carrier, a set of folding jaws mounted to swing on said carrier, means for swinging the set of jaws on its carrier and in the opposite direction to the movement of the carrier as they fold and take the sheet from the folding blade, and jaw opening means connected to one of said jaws and concentric with said jaw swinging means.

8. A folding machine including in combination a folding blade, a traveling carrier, a set of folding jaws rotating in an endless path on said carrier, operating means for said jaws, said operating means being mounted on said carrier and being connected to said jaws, and a moving guide which engages said operating means to rotate the set of jaws as it folds the sheet over the blade.

9. A folding machine including in combination a fixed folding blade, a traveling carrier, a set of folding jaws rotatably mounted on said carrier, operating means for said jaws, said operating means being mounted on said carrier and being connected to said jaws, and a moving guide which engages said operating means to rotate the set of jaws as it folds the sheet over the blade.

10. A folding machine including in combination a folding blade, a carrier rotating about a center, a set of folding jaws movably mounted on said carrier, an operating lever mounted on said carrier and connected to the set of jaws, and a moving guide which engages said lever to point the jaws toward the blade as they approach it.

11. A folding machine including in combination a folding blade, a carrier rotating about a center, a set of folding jaws movably mounted on said carrier, an operating lever mounted on and connected to the set of jaws, and a moving guide which engages said lever to point the jaws toward the blade as they approach it and as they leave it.

12. A folding machine including in combination a folding blade, a carrier rotating about a center, a set of folding jaws mounted to swing on said carrier, an operating lever mounted on and concentric with said set of jaws, and a moving guide which engages said lever to swing said set of jaws relatively to its carrier during the folding in of the sheet.

13. A folding machine including in combination a fixed folding blade, a traveling carrier, a set of folding jaws movably mounted on said carrier, an operating lever connected to the set of jaws, and a moving guide which engages said lever to point the jaws toward the blade as they approach it and as they leave it.

14. A folding machine including in combination a fixed folding blade, a carrier swinging about a center, a set of folding jaws mounted to swing on said carrier, an operating lever connected to said set of jaws, and a moving guide which engages said lever to swing said set of jaws relatively to its carrier during the folding in of the sheet.

15. A folding machine including in combination a horizontal sheet support, a fixed folding blade below said support, a rotating carrier above said support, a set of folding jaws rotatably mounted on said carrier, means for rotating said set of jaws relatively to said rotating carrier during the folding and taking of the sheet, and means for taking the sheet from the folding jaws by said folded edge while said set of jaws is at rest relatively to said carrier.

16. A folding machine including in combination a substantially horizontal sheet support, a fixed folding blade below the sheet, a rotating carrier above the sheet support, a set of folding jaws rotatably mounted on said carrier, means for rotating the set of jaws in the opposite direction to their carrier while they are folding and taking the sheet from the folding blade, and swinging means for opening said jaws concentric with the axis of said set of jaws.

17. A folding machine including in combination a folding blade, a carrier, and a plurality of sets of folding jaws mounted at a common point upon said carrier, and movable together relatively to said carrier.

18. A folding machine including in combination a folding blade, a traveling carrier, and a plurality of sets of folding jaws having a common axis upon said carrier and movable together relatively to said carrier.

19. A folding machine including in combination a fixed folding blade, a traveling carrier, and a plurality of sets of folding jaws having a common axis upon said carrier and movable together relatively to said carrier.

20. A folding machine including in combination a fixed folding blade, a rotating carrier, and a plurality of sets of folding jaws having a common axis upon said carrier and movable together relatively to said carrier.

21. A folding machine including in combination a folding blade, a carrier, a plurality of sets of folding jaws mounted at a common point upon and movable together relatively to said carrier, and means for causing said sets of jaws to be presented in succession to said folding blade to fold sheets thereover.

22. A folding machine including in combination a folding blade, a rotatable carrier, a plurality of sets of folding jaws having a common axis upon and rotatable together relatively to said carrier, and means for causing said sets of jaws to be presented in succession to said folding blade to fold sheets thereover.

23. A folding machine including in combination a fixed folding blade, a carrier, a plurality of sets of folding jaws mounted at a common point upon and movable together relatively to said carrier, and means for causing said sets of jaws to be presented in succession to said folding blade to fold sheets thereover.

24. A folding machine including in combination a fixed folding blade, a rotatable carrier, a plurality of sets of folding jaws having a common axis upon and rotatable together relatively to said carrier, and means for causing said sets of jaws to be presented in succession to said folding blade to fold sheets thereover.

25. A folding machine including in combination a folding blade, a carrier, a plurality of sets of folding jaws mounted at a common point upon and movable together relatively to said carrier, and means for causing said sets of jaws to be presented in succession to said folding blade to fold sheets thereover, and delivery means for taking the folded sheets from each set of jaws without again folding them.

26. A folding machine including in combination a folding blade, a rotating cylinder, a shaft rotatably mounted on said cylinder and carrying a set of folding jaws, a lever fixed to said shaft, a guide concentric with said cylinder for controlling said lever to prevent rotation of the set of jaws, said guide being discontinuous adjacent to the folding blade, and a moving guide for controlling said lever to rotate the jaws during the folding in of the sheet, said lever moving from the concentric guide to the moving guide and back to said concentric guide.

27. A folding machine including in combination a folding blade, a rotating cylinder, a shaft rotatably mounted on said cylinder and carrying a set of folding jaws, a lever fixed to said shaft, a guide concentric with said cylinder for controlling said lever to prevent rotation of the set of jaws, said guide being discontinuous adjacent to the folding blade, and a rotating guide for controlling said lever to rotate the jaws during the folding in of the sheet, said lever moving from the concentric guide to the rotating guide and back to said concentric guide.

28. A folding machine including in combination, a folding blade, a rotating cylinder, a shaft rotatably mounted on said cylinder and carrying a set of folding jaws fixed thereto, guiding means concentric with said cylinder, said guiding means being discontinuous adjacent to the folding blade, a lever fixed intermediately of its ends to said jaw shaft, both ends of said lever traveling in said guide, and a rotating guide for receiving one end of said lever from said guiding means whereby the set of jaws is rotated relatively to the cylinder during the folding in of the sheet and the other end of the lever is returned to said guiding means on the other side of the discontinued portion.

29. A folding machine including in combination a folding blade, a rotating cylinder, a set of folding jaws rotatably mounted on said cylinder, a cam concentric with said cylinder, a member connected to said set of jaws and coöperating with said cam to prevent rotating of the set of jaws relatively to their cylinder and a rotating guide coöperating with said member to rotate the set of jaws to fold the sheet over the folding blade.

30. A folding machine including in combination a folding blade, a rotating cylinder, a set of folding jaws rotatably mounted on said cylinder, a cam concentric with said cylinder, a lever connected to said set of jaws and coöperating with said cam to prevent rotation of the set of jaws relatively to said cylinder, and a rotating guide coöperating with said lever to rotate the set of jaws to fold the sheet over the blade, said lever passing from coöperation with the cam into coöperation with said guide and back again into coöperation with the cam.

31. A folding machine including in combination a folding blade, a rotating carrier, a set of folding jaws mounted to rotate together on and relatively to said carrier, means for causing said set of jaws to rotate relatively to their carrier during the folding of the sheet over said blade, and means for preventing the rotation of the set of jaws relatively to their carrier during the remainder of the rotation of said carrier.

32. A folding machine including in combination a folding blade, a rotating cylinder, a set of folding jaws rotatably mounted on said cylinder, means for causing said set of jaws to rotate relatively to their cylinder during the folding of the sheet over said blade, means for preventing the rotation of the set of jaws relatively to their carrier during the remainder of the rotation of said cylinder and means for releasing the sheet from said set of jaws while the set of jaws is prevented from rotation.

33. A folding machine including in combination a support for the sheet, a folding blade, a rotating cylinder above the sheet, a set of folding jaws mounted to rotate together upon said cylinder, a set of tapes passing around and away from said cylinder, a set of tapes above said cylinder and coöperating with said first mentioned set of tapes, means for causing the set of jaws to rotate to fold the sheet over and take it from the folding blade and means for causing said set of jaws to deliver the folded sheet to said two sets of tapes.

34. A folding machine including in combination a substantially horizontal support for the sheet, a fixed folding blade below the sheet, a rotating cylinder above the sheet, a set of folding jaws rotatable together upon said cylinder, a set of tapes passing around and away from said cylinder, a set of tapes above said cylinder and coöperating with said first mentioned set of tapes, means for causing the jaws to fold the sheet over the blade and to take it away, and means for causing said set of jaws to deliver the folded sheet to said two sets of tapes.

35. A folding machine including in combination a folding blade, a rotating cylinder, a set of folding jaws rotatably mounted on said cylinder, means for causing said jaws to point in the direction of their travel as they approach the folding blade, means for rotating said set of jaws relatively to their cylinder to fold the sheet over said blade and to take it therefrom, and for pointing the jaws in the opposite direction to their travel to lay the folded sheet on the cylinder.

36. A folding machine including in combination a fixed folding blade, a rotating cylinder, a set of folding jaws rotatably mounted on said cylinder, means for causing said jaws to point in the direction of their travel as they approach the folding blade, means for rotating said set of jaws relatively to their cylinder to fold the sheet over said blade and to take it therefrom, and for pointing the jaws in the opposite direction to their travel to lay the folded sheet on the cylinder.

37. A folding machine including in combination a fixed folding blade, a rotating cylinder, a set of tapes passing around and away from said cylinder, a set of folding jaws rotatably mounted on said cylinder, a set of tapes coöperating with said cylinder tapes to carry away the folded sheets, means for rotating said set of jaws to fold the sheet over the blade and take it away therefrom, means for causing the set of jaws to point in their direction of travel as they approach the blade, and for pointing them in the opposite direction from the direction of travel as they recede from the blade with the folded sheet, and means for causing the jaws to release the folded sheet into the bite of said two sets of tapes.

38. A folding machine including in combination a folding blade, a rotating cylinder, a set of folding jaws rotatably mounted on and relatively to said cylinder, means for rotating said set of folding jaws together to fold the sheet over the folding blade and to take the folded sheet therefrom, and means for holding said set of jaws against rotation during the remainder of the revolution of said cylinder.

39. A folding machine including in combination a fixed folding blade, a rotating cylinder, a set of folding jaws rotatably mounted on said cylinder, means for rotating said set of folding jaws to fold the sheet over the folding blade and to take the folded sheet therefrom, and means for holding said set of jaws against rotation during the remainder of the revolution of said cylinder.

40. A folding machine including in combination a fixed folding blade, a rotating cylinder, a set of tapes passing around and away from said cylinder, a set of folding jaws rotatably mounted on said cylinder, and a set of tapes coöperating with said cylinder tapes to carry away the folded sheets.

41. A folding machine including in combination a fixed folding blade, a rotating cylinder, a set of tapes passing around and away from said cylinder, a set of folding jaws rotatably mounted on said cylinder, a set of tapes coöperating with said cylinder tapes to carry away the folded sheets, means for rotating the set of jaws to fold the sheet over the blade and then to lay it upon the cylinder, and means for releasing the sheet when in the bite of the two sets of tapes.

42. A folding machine including in combination a fixed folding blade, a cylinder, a set of folding jaws rotatably mounted upon said cylinder, a set of tapes passing around said cylinder, means for pointing said jaws in the direction of travel of said cylinder and for giving them a quarter turn onto the folding blade to fold and take the sheet and a quarter turn in leaving said blade with the sheet to a position where they point in the opposite direction to that of the travel of the cylinder, a coöperating set of tapes and means for causing the grippers to release the sheet to said tapes.

43. A folding machine including in combination a folding blade, a traveling carrier, a set of folding jaws rotatably mounted on said carrier, and means for giving said set of jaws a quarter revolution on to the folding blade and a quarter revolution off the blade and for holding the jaws at rest during the remainder of the travel of the carrier.

44. A folding machine including in combination a fixed folding blade, a traveling carrier, a set of folding jaws rotatably mounted on said carrier, and means for giving said set of jaws a quarter revolution on to the folding blade and a quarter revolution off the blade and for holding the jaws at rest during the remainder of the travel of the carrier.

45. A folding machine including in combination a fixed folding blade, a rotating carrier, a set of folding jaws rotatably mounted on said carrier, and means for giving said set of jaws a quarter revolution on to the folding blade and a quarter revolution off the blade and for holding the jaws at rest during the remainder of the travel of the carrier.

46. A folding machine including in combination a fixed folding blade, a traveling carrier, a set of folding jaws rotatably mounted on said carrier, and means for causing said jaws to approach the blade at rest relatively to said carrier and pointing in the direction of travel, then to make a quarter turn onto the blade to fold and take the sheet and then a quarter turn in taking away the sheet to a position pointing in the opposite direction from the direction of travel.

47. A folding machine including in combination a fixed folding blade, a rotating carrier, a set of folding jaws rotatably mounted on said carrier, an operating member connected to said set of jaws, and a rotatable member provided with a guide slot in which said member is guided to rotate the set of jaws relatively to their carrier as they engage the blade to fold and take the sheet and just prior and subsequent to said engagement.

48. A folding machine including in combination a fixed folding blade, a rotating carrier, a set of folding jaws rotatably mounted on said carrier, an operating member connected to said set of jaws, and a movable member provided with a guide slot in which said member is guided to rotate the set of jaws relatively to their carrier as they engage the blade to fold and take the sheet and just prior and subsequent to said engagement.

49. A folding machine including in combination a stationary folding blade, a set of folding jaws swinging around a plurality of centers, coöperating with said blade, and means for taking the sheet from said folding jaws by said folded edge while said folding jaws are at rest relatively to one of said centers.

50. A folding machine including in combination a stationary folding blade, a set of folding jaws swinging around one center in one direction and around another center only during the folding in of the sheet, and means for taking the sheet from said folding jaws by said folded edge.

51. A folding machine including in combination a traveling carrier, a support rotatably mounted thereon, two sets of folding jaws fixed to said support and diametrically opposite each other.

52. A folding machine including in combination a fixed folding blade, a rotating carrier, two sets of folding jaws mounted on said carrier, pointing in opposite directions, and rotating together relatively to the carrier.

53. A folding machine including in combination a pathway along which the sheets are progressed to the place of folding, a set of folding jaws intermittently rotatable about an axis arranged longitudinally of the path of travel of the sheets along said pathway, a folding blade coöperating with said set of jaws to fold the positioned sheets and carry them away for delivery and means for delivering the sheets from said jaws without an additional fold.

54. A folding machine including in combination a pathway along which the sheets are progressed to the place of folding, a folding blade arranged longitudinally of said pathway below the positioned sheet, a set of folding jaws above said sheet intermittently rotating about an axis arranged longitudinally of said pathway for folding and carrying away the sheet and means for delivering the sheets from said jaws without an additional fold.

55. A folding machine including in combination a pathway along which the sheet is progressed, a folding blade arranged longitudinally of said pathway, a set of folding jaws intermittently rotating transversely of said pathway for folding the sheet over said folding blade and carrying away the folded sheets and means for delivering the sheets from said jaws without an additional fold.

56. A folding machine including in combination a pathway along which the sheets are traveled, means for so traveling the sheets, a folding blade arranged longitudinally below said pathway, a swinging carrier arranged above said pathway, and a set of folding jaws swinging intermittently on said carrier for folding a sheet over said blade and for carrying it away therefrom.

57. A folding machine including in combination a folding blade, a carrier swinging about an axis, a pair of folding jaws mounted to swing together on said carrier, a swinging guide, and means connected to said set of jaws which enter said guide to swing said set of jaws during the folding of the sheet.

58. A folding machine including in combination a folding blade, a carrier swinging about an axis, a pair of folding jaws mounted to swing together on said carrier, a swinging guide, and means connected to said set of jaws which enter said guide to swing said set of jaws during the folding of the sheet and during the swinging of said carrier.

59. A folding machine including in combination a folding blade, a rotating carrier, a pair of folding jaws mounted to rotate together on said carrier, a rotating guide, and means connected to said set of jaws which enter said rotating guide to rotate the set of jaws during the folding in of the sheet.

60. A folding machine including in combination a folding blade, a rotating carrier, a pair of folding jaws mounted to rotate together on said carrier, a rotating guide, and means connected to said set of jaws which enter said rotating guide to rotate the set of jaws during the folding in of the sheet during the rotation of said carrier.

61. A folding machine including in combination a fixed folding blade, a carrier swinging about an axis, a pair of folding jaws mounted to swing together on said carrier, a swinging guide, and means connected to said set of jaws which engage said guide to swing said set of jaws during the folding of the sheet.

62. A folding machine including in combination a fixed folding blade, a rotating carrier, a pair of folding jaws mounted to rotate together on said carrier, a rotating guide, and means connected to said set of jaws which engage said rotating guide to rotate the set of jaws during the folding in of the sheet.

63. A folding machine including in combination a fixed folding blade, a rotatable carrier, a pair of jaws rotatable on said carrier, means for rotating the pair of jaws relatively to said carrier while folding in the sheet, and means for preventing the rotation of said jaws while carrying the sheet by said folded edge.

64. A folding machine including in combination a fixed folding blade, a rotatable carrier, a pair of jaws rotatable on said carrier, a slotted rotating cam for rotating the pair of jaws relatively to said carrier while folding in the sheet and means for preventing the rotation of said jaws while carrying the sheet by said folded edge.

65. A folding machine including in combination a fixed folding blade, a rotatable carrier, a pair of jaws rotatable on said carrier, a slotted rotating cam for rotating the pair of jaws relatively to said carrier while folding in the sheet and a cam groove for preventing the rotation of said jaws while carrying the sheet by said folded edge.

66. A folding machine including in combination a folding blade, a rotatable carrier, a shaft rotatable on said carrier, a set of folding jaws carried by and rotatable with said shaft, an arm attached to said shaft, and a rotary, slotted cam with which said arm engages to rotate the set of jaws during the folding in of the sheet.

67. A folding machine including in combination a folding blade, a rotatable carrier, a shaft rotatable on said carrier, a set of folding jaws carried by and rotatable with said shaft, an arm attached to said shaft, and a rotary, slotted cam with which said arm engages to rotate the set of jaws during the folding in of the sheet, and means for opening the jaws during the folding in of the sheet.

68. A folding machine including in combination a folding blade, a rotatable carrier, a shaft rotatable on said carrier, a set of folding jaws carried by and rotatable with said shaft, an arm attached to said shaft, and a rotary, slotted cam with which said arm engages to rotate the set of jaws during the folding in of the sheet, and means for preventing said rotation of said set of jaws while carrying the sheet by said folded edge.

69. A folding machine including in combination a folding blade, a rotatable carrier, a shaft rotatable on said carrier, a set of folding jaws carried by and rotatable with said shaft, an arm attached to said shaft, and a rotary, slotted cam with which said arm engages to rotate the set of jaws during the folding in of the sheet, and a cam groove with which said arm engages to prevent rotation of said set of jaws while carrying the sheet by said folded edge.

70. A folding machine including in combination a folding blade, a rotating carrier, a shaft rotatably mounted on said carrier, a pair of folding jaws fixed to rotate with said shaft, an arm fixed centrally to said shaft and extending therefrom in both directions, a circular cam concentric with said carrier and with which both ends of said arm engage, and a rotating guide with which one end of said arm engages during the folding of the jaws over the blade.

71. A folding machine including in combination a folding blade, a rotating carrier, a shaft rotatably mounted on said carrier, a pair of folding jaws fixed to rotate with said shaft, an arm fixed centrally to said shaft and extending therefrom in both directions, a circular cam concentric with said carrier and with which both ends of said arm engage, and a rotating guide into which one end of said arm enters during the folding of the jaws over the blade.

72. A folding machine including in combination a fixed folding blade, means for feeding the sheets and positioning them relatively to said folding blade, a traveling carrier, a set of traveling folding jaws carried by and having an intermittent rotation relatively to said carrier, and operating from above to fold said sheets over said blade and to carry them away by the folded edge, and delivery means for taking the sheets from said folding jaws by the edge folded into said jaws by said folding blade, while said jaws are at rest relatively to their carrier.

73. A folding machine including in combination a straight path along which the sheets are progressed, a folding blade arranged longitudinally below said path, an intermittently rotating set of folding jaws arranged longitudinally above said path for folding the sheets over said blade and carrying them away, delivery means for taking the folded sheets at the folded edge folded into said jaws by said folding blade, and delivering them at the side of said path.

In testimony whereof, I have signed my name to this specification, in the presence of two subscribing witnesses.

RALPH C. SEYMOUR.

Witnesses:
S. J. GENSLER,
JOHN D. MORGAN.

---

Copies of this patent may be obtained for five cents each, by addressing the "Commissioner of Patents, Washington, D. C."